United States Patent
Walters et al.

[11] 3,778,696
[45] Dec. 11, 1973

[54] FEEDBACK FAULT INDICATE CIRCUIT

[75] Inventors: Ronnie G. Walters, Mayfield Heights; Theodore J. Markley, Mentor; Richard E. Jennings, Wickliffe, all of Ohio

[73] Assignee: Allen-Bradley Company, Milwaukee, Wis.

[22] Filed: June 23, 1972

[21] Appl. No.: 265,928

[52] U.S. Cl. .............................. 318/565, 340/419
[51] Int. Cl. ................................. G05b 23/02
[58] Field of Search .................... 318/565; 340/222, 340/419

[56] References Cited
UNITED STATES PATENTS

| | | | |
|---|---|---|---|
| 3,406,319 | 10/1968 | Faulkes | 318/565 |
| 3,150,319 | 9/1964 | Hofferber | 318/565 X |
| 3,405,337 | 10/1968 | Popik | 318/565 X |

*Primary Examiner*—B. Dobeck
*Attorney*—Barry E. Sammons et al.

[57] ABSTRACT

In the servo system of a numerically controlled machine the position feedback signal is monitored by a fault indicate circuit. An absolute analog position signal is generated by an integrator circuit connected to receive a signal proportional to machine speed. Under normal operating conditions, the integrator circuit is repeatedly reset to zero by a reference reset switch and the magnitude of the absolute position signal is thus maintained below a preset limit. The reference reset switch is controlled by the position feedback signal being monitored and when the feedback signal is lost due to a malfunction, the integrator circuit is not reset and the absolute analog position signal rises above the preset limit. This condition is sensed by a level detector which generates a fault indicate signal.

8 Claims, 6 Drawing Figures

FEEDBACK FAULT INDICATE CIRCUIT

BACKGROUND OF THE INVENTION

The invention relates to the position servo mechanism on numerically controlled machines, and more specifically to a means of detecting and indicating malfunctions which may occur in the position feedback transducer or its associated circuitry.

In the position servo mechanism of a numerically controlled machine, machine position information is fed back and compared with a command signal generated by the numerical control system. The resulting following error signal is applied to a servo amplifier which drives a motor. In positioning control systems the magnitude of the following error represents the distance between the present machine position and the final commanded position. In contouring control systems, the following error not only represents distance to travel, but it also determines the instantaneous machine velocity.

In both positioning and contour control systems, machine position, or displacement, is sensed by a position transducer that is mechanically coupled to the drive motor. There are numerous types of position transducers and the position feedback signal which they generate may be either an analog signal or a digital signal, and it may represent either the absolute position of the machine from a reference point, or it may indicate increments of machine displacement. Many position transducers such as resolvers and inductosyns require considerable electronics for proper operation. Also, it is quite common to convert analog position feedback signals to digital position feedback signals by means of an analog to digital converter circuit. Consequently, there is often a considerable amount of electronic circuitry associated with the position feedback loop, which circuitry is subject to malfunctions that may result in the loss of the position feedback signal.

If a malfunction should occur which results in the loss of the position feedback signal, the following error is not properly updated, and either inaccurate machining, or in the case of contouring systems, excessive machine velocity results. It is highly desirable, therefore, that a malfunction in the position transducer, its associated circuitry, or the analog to digital converter be detected and indicated to the machine tool operator or control system.

Prior means of indicating the loss of position feedback provide either incomplete protection or do not respond rapidly enough. For example, the following error may be monitored and when it becomes excessive, a malfunction may be assumed and the machine shut down. Although such a detection means prevents damage to a machine by limiting its maximum velocity, it does not detect momentary or intermitant loss of feedback information which may result in inaccurate machining. Another commonly used method of detecting malfunctions in the position transducer is to monitor the magnitude of the electrical power supplied to it. For example, one commonly used position transducer is the optical encoder which depends upon one or more incandescent lamps. The operation of such encoders can be monitored by sensing the amount of power supplied to its lamps.

Still another method which is sometimes used to detect failures in the position feedback circuitry is to check its output against that of a back-up, or redundant position feedback system. The output of the redundant system is compared with that of the operating system and an alarm is sounded when a discrepancy occurs. The cost of such a redundant position feedback system becomes prohibitive when its resolution is increased to provide rapid malfunction detection.

SUMMARY OF THE INVENTION

The invented fault indicate circuit monitors a position feedback signal and generates a fault indicate signal when a malfunction occurs. It includes an analog signal generator connected to sense machine tool velocity and generate an absolute analog position signal, a reference reset switch connected to receive the position feedback signal and to repeatedly reset the analog signal generator to zero in response to the presence of the position feedback signal, and a level detector connected to receive the absolute analog position signal from the analog signal generator and to generate a fault indicate signal when the magnitude thereof reaches a preset level.

When the position feedback signal is in the form of digital pulses, the reference reset switch may be operated directly by each digital pulse to reset the analog signal generator output to zero volts. Otherwise, a digital feedback generator is provided which converts the position feedback signal to a series of digital pulses proportional in number to the amount of machine displacement. In either case, as long as the position feedback signal is present during machine motion, the absolute analog signal is maintained below the preset limit by the operation of the reference reset switch.

A general object of the invention is to detect and rapidly indicate a malfunction in the position feedback system. The position feedback signal results in the generation of a series of pulses that operate the reference reset switch. If one such pulse is missed due to a malfunction in either the position transducer or its associated electronic equipment, the absolute analog position signal rises above the preset limit and a fault indicate signal is generated at the output of the level detector. The fault indicate signal may provide a visual indication to the machine tool operator and/or automatically shut down the numerical control system.

Another general object of the invention is to provide a fault indicate circuit which will monitor the operation of any position transducer. Regardless of the type of position transducer used, the position feedback signal which it generates may be converted to a corresponding pulse train to operate the reference reset switch.

A more specific object of the invention is to provide a reliable, relatively inexpensive fault indicate circuit. A signal indicative of machine tool speed is generally available in the numerical control system. Such a speed signal may be generated by a tachometer coupled to the drive motor or, when a d-c drive motor is used, the voltage across its armature will suffice. The analog signal generator includes an integrator circuit which is connected to receive this speed signal and integrate the same with respect to time to provide the absolute analog position signal.

Another specific object of the invention is to provide a fault indicate circuit which will detect and indicate a malfunction in either, or both, of the output signals of a two channel shaft encoder. The two phase-displaced digital incremental feedback signals generated by shaft encoders are converted to a single series of digital pulses which operate the reference reset switch. If a temporary or permanent failure occurs in either or both of the encoder channels, one or more pulses are not generated and a fault indicate signal is produced.

The foregoing and other objects and advantages of the invention will appear from the following description. In the description reference is made to the accompanying drawings which form a part hereof and in which there is shown by way of illustration several preferred embodiments of the invention. Such embodiments do not necessarily represent the full scope of the invention, and reference is made to the claims herein for interpreting the breadth of the invention.

DESCRIPTION OF THE PREFERRED EMBODIMENTS

Figure 1:
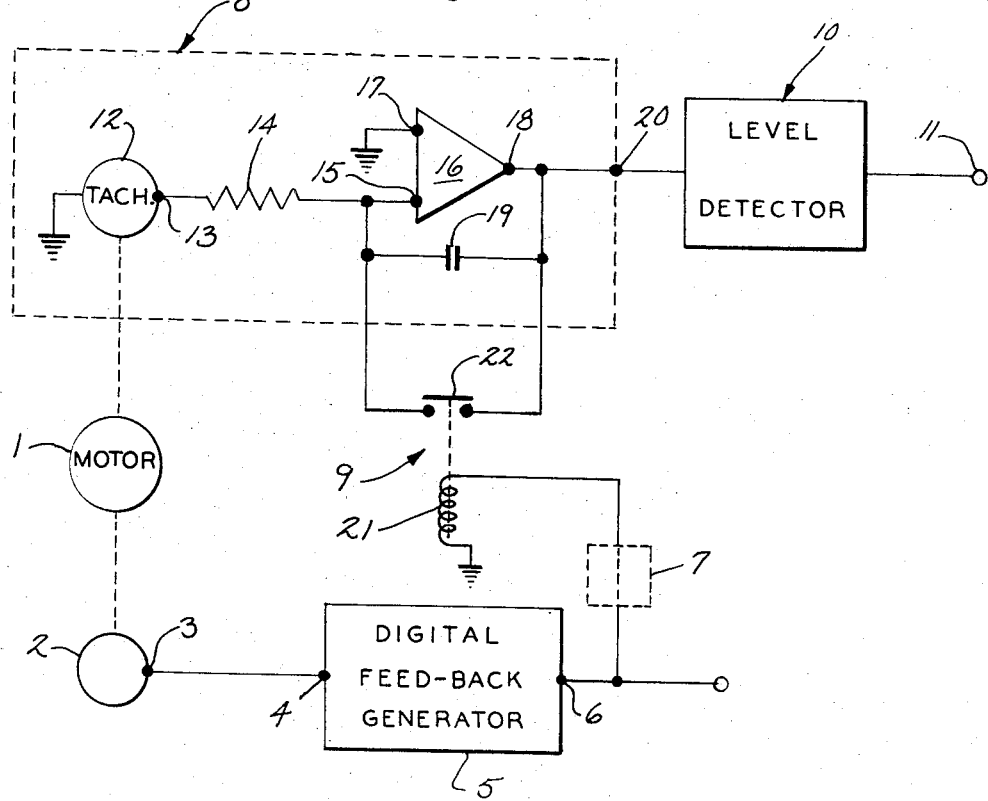
FIG. 1 is an electrical schematic diagram of a preferred embodiment of the invented fault indicate circuit.

Referring to FIG. 1, a motor 1 is operated under numerical control to move the slide on a machine tool in accordance with instructions on a magnetic tape. To provide information regarding the position of the machine slide, a position transducer 2 is mechanically coupled to the motor 1. The position transducer 2 is a resolver which operates to generate an analog position feedback signal at an output terminal 3. The position transducer 2 may be operated in a conventional manner to generate an absolute position feedback signal at the output terminal 3, or it may be operated in a manner such as that disclosed in U.S. Pat. No. 3,611,101 issued to Kiffmeyer et al on Oct. 5, 1971, in which an incremental analog position feedback signal is generated. In either case, the analog position feedback signal is applied to an input terminal 4 of a digital feedback generator 5. The digital feedback generator 5 is commonly referred to as an analog to digital converter which operates to convert the analog position feedback signal into digital form. The resulting digital incremental position feedback signal is a series of voltage state transitions, each positive voltage transition representing one increment of machine displacement. This digital incremental position feedback signal is generated at the output terminal 6 and is applied to the numerical control system to update the following error.

The structure described above comprises part of the numerical control system to which the first embodiment of the invented fault indicate circuit is attached. In this first embodiment of the invention, the analog to digital converter of the control system also serves as the digital feedback generator 5. However, a conventional monoshot circuit 7 is attached to its output terminal 6 to alter the form of the generated digital incremental position feedback signal. Specifically, the monoshot circuit 7 operates to generate a 4 microsecond digital voltage pulse each time a positive voltage transition occurs at the output terminal 6. It should be apparent to those skilled in the art, however, that the fault indicate circuit may also be applied to a numerical control system in which such digital feedback pulses are generated within the existing system. In such case there is no need for the monoshot circuit 7 and to indicate this possibility, the monoshot circuit 7 is designated with dashed lines in FIG. 1.

The fault indicate circuit of FIG. 1 includes three basic elements: an analog signal generator designated generally by the dashed lines 8; a reference reset switch 9; and a level detector 10. These elements operate to generate a fault indicate signal at an output terminal 11 when there is a failure in the system that results in the loss of a digital incremental feedback pulse at the terminal 6. This fault indicate signal may be used to shut down the numerical control system or to sound an appropriate alarm to the machine operator.

The analog signal generator 8 includes a tachometer 12 which is mechanically connected to the motor 1 and which operates to generate a d-c voltage proportional to motor speed. The tachometer 12 is usually present as part of a numerically controlled machine to provide a speed feedback signal, and is not, therefore, an item which must be added. The motor speed signal is generated at a tachometer output terminal 13 and through a coupling resistor 14 to an inverting input terminal 15 on an integrator amplifier 16. The amplifier 16 is an operational amplifier available commercially in integrated circuit form. It has a noninverting input terminal 17 connected to circuit ground and an output terminal 18 which is connected to the inverting input terminal 15 through a feedback capacitor 19.

An integrator circuit is formed by the amplifier 16, coupling resistor 14, and feedback capacitor 19. It integrates the speed signal received from the tachometer 12 (with respect to time) to form an analog position signal at an output terminal 20. The analog position signal is proportional in magnitude to the distance between the present machine position and a zero reference point. Thus it can be characterised as an absolute analog position signal although, as will be apparent from the discussion below, it is repeatedly reset to zero by the operation of the reference reset switch 9.

The reference reset switch 9 is a relay which includes a coil 21 connected across the output of the digital feedback generator 5 to receive the generated digital pulses. The relay also includes a set of normally open contacts 22 which connect across the feedback capacitor 19. Each time a digital incremental feedback pulse is generated by the digital feedback generator 5, the coil 21 is energized and the contacts 22 are closed. A current path is thus established and the feedback capacitor 19 is discharged. When the capacitor 19 is thus discharged, the analog position signal at the output terminal 20 is reset to zero volts to effectively reset the zero reference position of the analog signal generator.

Figure 4:
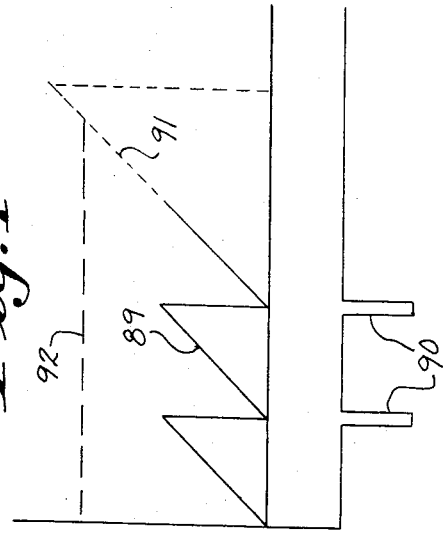
FIG. 4 is a graphic representation of the absolute analog position signal in relation to the digital reset pulses.

As shown by the waveform 89 in FIG. 4, the analog position signal at the output terminal 20 steadily rises during one increment of machine tool motion and then drops to zero when a digital incremental position feedback pulse 90 is generated. Under normal operating conditions, the amplitude which the analog position signal reaches is constant for all speeds. However, if a digital incremental position feedback pulse is not generated by the digital feedback generator 5, the reference reset switch 9 is not actuated and the analog position signal at the terminal 20 continues to increase in magnitude. The continued rise in amplitude indicates that the motor 1 has displaced the machine and that a corresponding position feedback signal has not been generated.

Such a rise in the absolute analog position signal indicates a faulty condition which is sensed by the level detector 10. The level detector 10 is a standard circuit which operates to sense the magnitude of the applied analog position signal and generate a digital fault indicate signal at the output terminal 11 when the analog position signal reaches a present magnitude. There are numerous level detector circuits known to those skilled in the art which perform this function.

The analog signal generator 8 described above and shown in FIG. 1, generates an analog position signal which has a polarity that is determined by the direction of machine motion. The integrator amplifier 16 has a differential input and the feedback capacitor 19 is nonpolarized. The magnitude of the resulting positive or negative analog position signal is detected by the level detector 10. This "bidirectional" analog signal generator 8 requires minimal circuitry, however, a somewhat more complex level detector 10 is required and the reference reset switch 9 must be bi-polar.

Figure 2:
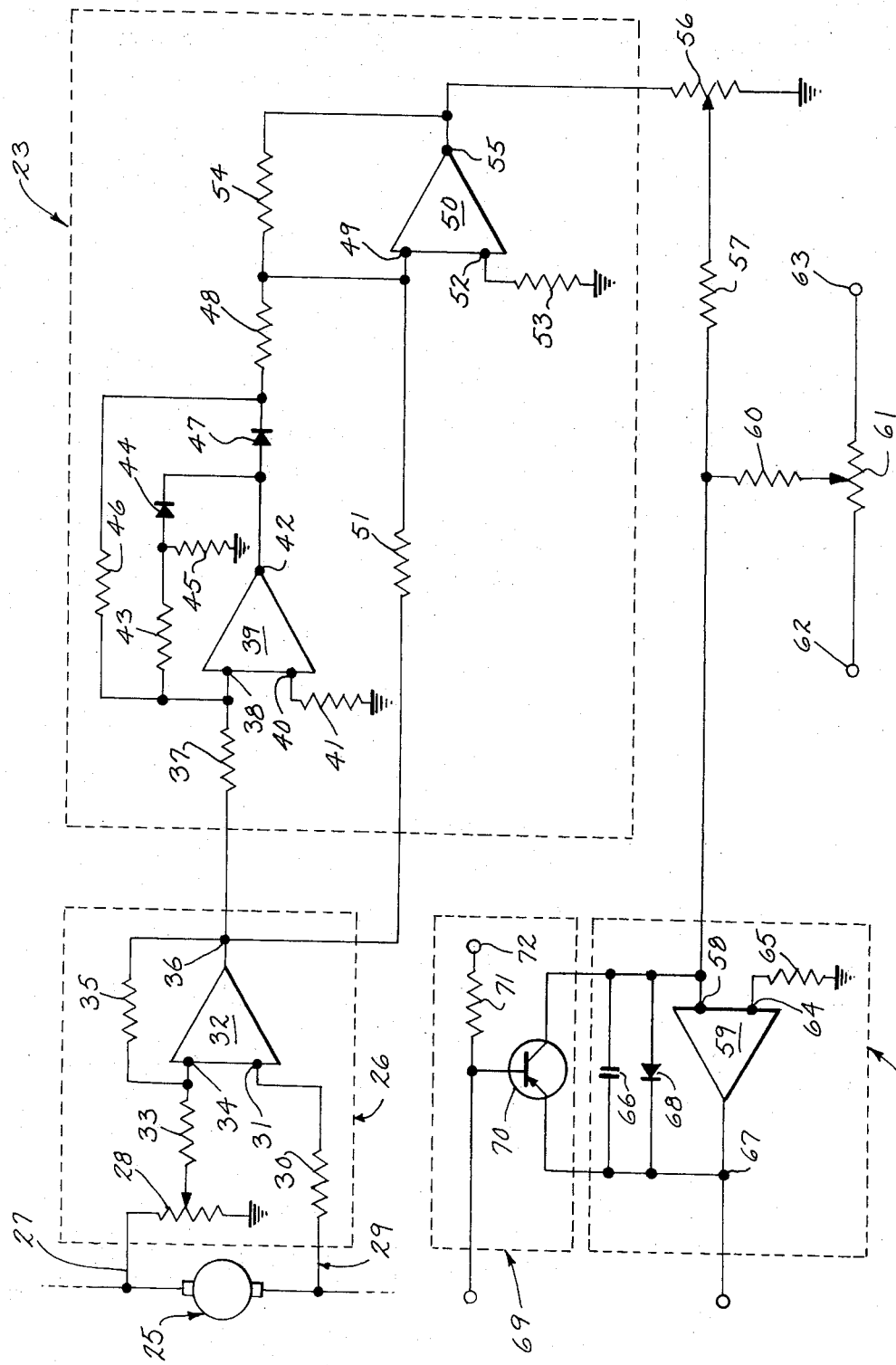
FIG. 2 is an electrical schematic diagram of an alternative embodiment of the analog signal generator and reference reset switch which form a part of the circuit of FIG. 1.

An alternative embodiment of the analog signal generator is shown in FIG. 2 along with an alternative embodiment of the reference reset switch. The analog signal generator of FIG. 2 includes an absolute value circuit, designated generally by the dashed lines 23, an integrator circuit, designated generally by the dashed lines 24; a transducer buffer circuit, indicated generally by the dashed line 26; and a speed transducer 25.

The speed transducer 25 is a tachometer connected to sense the rate at which the machine is moved and to generate a speed signal to the buffer circuit 26. The transducer buffer circuit 26 includes a first lead 27 which connects to one terminal of the speed transducer 25 and to circuit ground through a level potentiometer 28. A second input lead 29 connects to the other lead of the speed transducer 25 and through a first coupling resistor 30 to the noninverting input terminal 31 of an operational amplifier 32. The slider on the potentiometer 28 connects through a second coupling resistor 33 to the inverting input terminal 34 of the amplifier 32. A feedback resistor 35 connects the inverting input terminal 34 to an amplifier output terminal 36. The transducer buffer circuit 26 operates to amplify the speed feedback signal generated by the transducer 25. The gain is adjustable to suite various commercially available speed transducers.

The output terminal 36 of the transducer buffer circuit 26 connects to the input of the absolute value circuit 23. It connects through a first coupling resistor 37 to the inverting input terminal 38 of a second operational amplifier 39, the noninverting input terminal 40 of which connects through a ground resistor 41 to circuit ground. A first feedback loop, including a first feedback resistor 43 and a first blocking diode 44, connect between the inverting input 38 and an amplifier output terminal 42. The cathode of blocking diode 44 connects to the amplifier output terminal 42 and its anode connects to circuit ground through a second grounding resistor 45. A second feedback loop, including a second feedback resistor 46 and a second blocking diode 47, connect between the amplifier input terminal 38 and the amplifier output terminal 42. The anode of the second blocking diode 47 connects to output terminal 42 and its cathode connects through a second coupling resistor 48 to an inverting input terminal 49 on a third operational amplifier 50. The inverting input terminal 49 is also connected to the buffer output terminal 36 through a fourth coupling resistor 51. A noninverting input terminal 52 on the third operational amplifier 50 connects to circuit ground through a grounding resistor 53, and a feedback resistor 54 connects inverting input terminal 49 to an output terminal 55. The amplifier output terminal 55 forms the output of the absolute value circuit 23.

The absolute value circuit 23 operates to generate an analog speed signal of negative polarity regardless of the polarity of the speed signal generated at the buffer output terminal 36. The resistance of the first coupling resistor 37, the first feedback resistor 43 and the second feedback resistor 46 are equal in value (4.99K). The second operational amplifier 39, therefore, operates to invert the speed signal at the buffer output terminal 36 and provide unity gain. If the speed signal is positive, the resulting inverted signal at the amplifier output terminal 42 is negative and the first blocking diode 44 is forward biased to conduct current through the second grounding resistor 45. The second blocking diode 47 is reverse biased and operates to block a negative signal. The same positive speed signal is applied through the fourth coupling resistor 51 to the third operational amplifier 50. The fourth coupling resistor 51 and the feedback resistor 54 have identical resistance values (20K) and, therefore, the positive speed signal is inverted and generated at the amplifier output terminal 55 with unity gain.

When the machine is moving in the opposite direction and a negative speed signal is generated at the buffer output terminal 36, a positive voltage results at the output terminal 42 of the second operational amplifier 39. As a result, the second blocking diode 47 is forward biased and conducts the positive signal through the second coupling resistor 48 to the third operational amplifier 50. The resistance value of the second coupling resistor 48 is one-half that of the feedback resistor 54 and, therefore, a voltage gain of two is provided for the positive signal generated by the second operational amplifier 39. The negative speed signal is also applied directly to the third operational amplifier 50 through the fourth coupling resistor 51. It subtracts from the positive signal applied through second coupling resistor 48 with the result that a net negative output signal is generated at amplifier output 55 that is equal in magnitude to the applied speed signal.

The absolute value circuit 23 is coupled to the integrator circuit 24 through a level potentiometer 56 and a coupling resistor 57. The amplifier output terminal 55 connects through the level potentiometer 56 to signal ground and the slider on the level potentiometer 56 connects through the coupling resistor 57 to an inverting input terminal 58 on an integrator amplifier 59. A zero-set circuit also connects to the inverting input 58 and includes a coupling resistor 60 connected to the slider of a reference potentiometer 61. The reference potentiometer 61 connects between a positive d-c supply terminal 62 and a negative d-c supply terminal 63. The resistance value of the coupling resistors 60 and the reference potentiometer 61 are relatively high compared to the resistance value of the coupling resistor 57. When the machine tool is idle and no speed signal is generated, the reference circuit operates to hold the inverting input terminal 58 at zero volts. When a speed signal is generated, however, the zero reference voltage developed at the slider of the reference potentiometer 61 is effectively decoupled.

The integrator circuit 24 is similar to the integrator circuit discussed above. The integrating amplifier 59 includes a noninverting input terminal 64 which connects to signal ground through a grounding resistor 65, and a feedback capacitor 66 is connected between an inverting input terminal 58 and an amplifier output terminal 67. In addition, however, a diode 68 is connected in parallel with the feedback capacitor 66 to shunt any positive voltage which might be applied to the integrator input Such a positive voltage might be applied, for example, when the machine is idle and temperature variations cause the zero reference circuit to generate a slight positive voltage.

Due to the unidirectional, or single-polarity nature of the analog signal generator of FIG. 2, an electronic reference reset switch can be used. This alternative reference reset switch is designated in FIG. 2 by the dashed line 69 and it includes a PNP transistor 70 having its current carrying elements connected across the feedback capacitor 66 of the integrator circuit 24. The base of the transistor 70 connects through a bias resistor 71 to a positive d-c supply terminal 72 and to the output of the digital feedback generator 5 through a lead 73.

The reference reset switch 69 operates to reset the integrator circuit 24 to zero each time a digital position feedback pulse is received. The PNP transistor 70 is biased in its off state by the positive voltage applied to its base through the bias resistor 71. The reference reset switch circuit 69 resets the integrator circuit 24 when a negative digital voltage pulse is applied through the lead 73. The transistor 70 is thus driven into conduction and it operates to discharge any voltage across the feedback capacitor 66.

Figure 3:
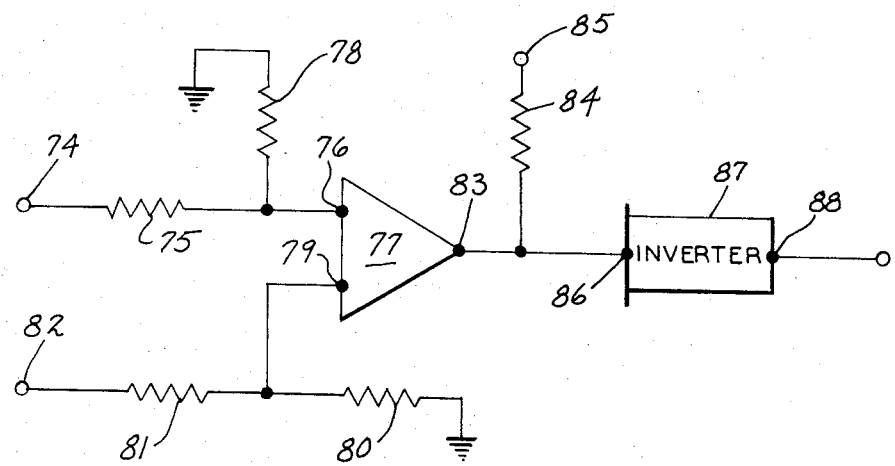
FIG. 3 is an electrical schematic diagram of the level detector which forms a part of the circuit of FIG. 1.

A level detector circuit which is particularly suited for use with the analog feedback generator of FIG. 2 is shown in FIG. 3. It includes an input terminal 74 which connects to the output terminal 67 of the integrator amplifier 59. The input 74 connects through a first coupling resistor 75 to the inverting input terminal 76 of an operational amplifier 77, which in turn connects to signal ground through a voltage divider resistor 78. A noninverting input terminal 79 on the amplifier 77 connects to the juncture of a pair of voltage divider resistors 80 and 81. The resistors 80 and 81 connect in series between a positive d-c supply terminal 82 and signal ground. An output terminal 83 on the operational amplifier 77 connects through a load resistor 84 to a negative d-c supply terminal 85 and to an input terminal 86 on an inverter circuit 87. An output terminal 88 on the inverter circuit 87 forms the output terminal of the fault indicate circuit.

Under normal operating conditions, a positive voltage is developed at the noninverting input terminal 79 which exceeds the positive voltage applied to the inverting input terminal 76. As a result, the output 83 of the operational amplifier 77 is driven to a positive voltage. This positive voltage is inverted by the inverter circuit 87 and a logic low voltage state is generated at the output 88. However, when the analog position signal exceeds a preset magnitude determined by the values of voltage divider resistors 78, 80 and 81, the amplifier output is driven to a logic low voltage. This logic low voltage is inverted by the inverter circuit 87 to provide a fault indicate signal at output 88.

Referring to FIG. 4, during normal operation the analog position output signal generated by the integrator circuit 24 is a sawtooth waveform 89 which repeatedly reaches a preset magnitude and is then reset by a digital pulse 90 applied to the reference reset switch 69. The speed of the machine tool determines both the slope of the sawtooth waveform 89 and the spacing of the digital pulses 90. That is, at higher machine speeds the analog position signal increases at a faster rate, but the digital position feedback pulses also occur at a higher rate. Under normal operating conditions, therefore, the maximum amplitude of the waveform 89 remains constant. If for some reason a fault occurs in the digital feedback system and a digital position feedback pulse is not generated, the amplitude of the waveform 89 increases above the normal level as indicated by the dashed line 91. The analog position waveform 89 is applied to the input terminal 74 of the detector circuit and the values of the coupling resistor 75 and voltage divider resistors 78, 80 and 81 are selected to establish a threshold voltage, or preset voltage level as indicated by the dashed line 92. This level is exceeded when one digital position feedback pulse is missed, and a logic high voltage is therefore generated at the inverter circuit output terminal 88. This logic high voltage is a fault indicate signal which is conducted to an appropriate warning device or to the numerical control circuitry.

Figure 6:
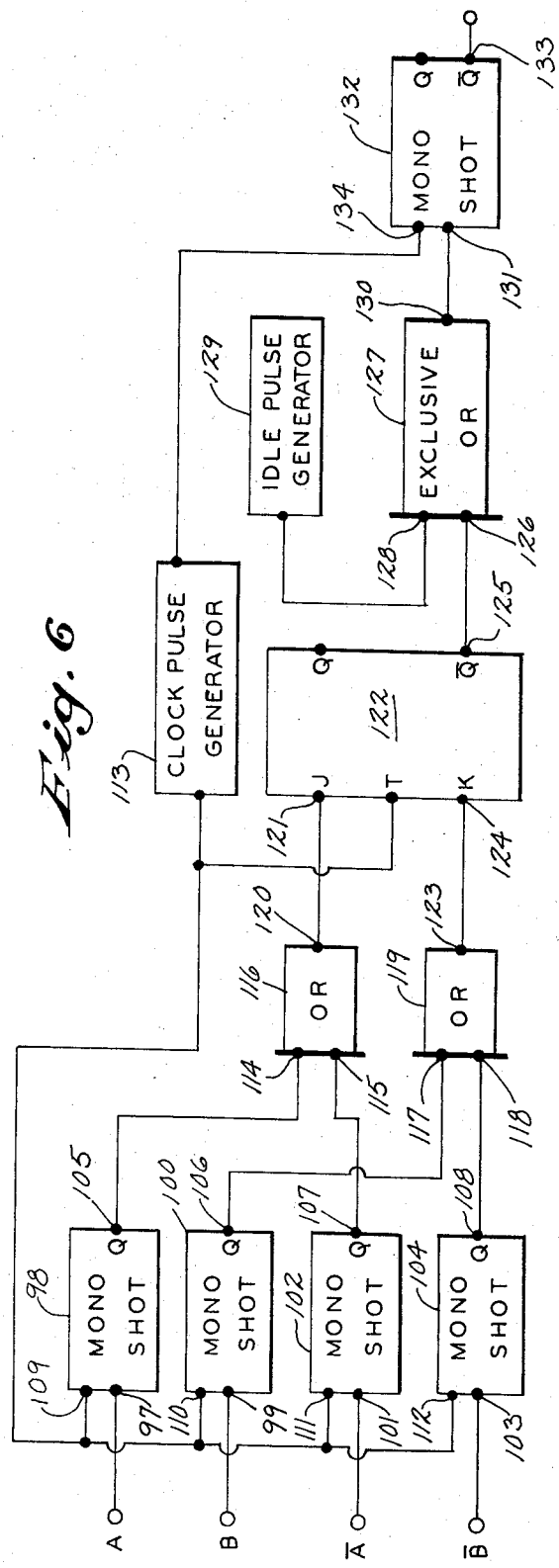
FIG. 6 is an electrical schematic diagram of the digital feedback generator which forms a part of the circuit of FIG. 1.
Figure 5:
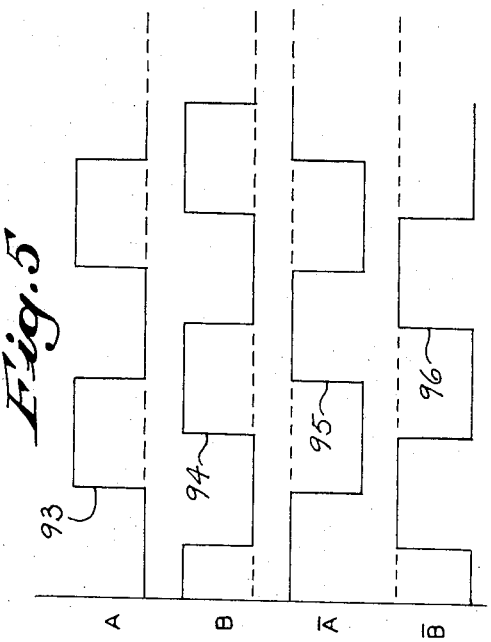
FIG. 5 is a graphic representation of the output of a two channel shaft encoder.

As discussed above, the fault indicate circuit of FIG. 1 is adapted to operate in conjunction with an existing control system that provides a digital incremental position feedback signal at some point in the feedback loop. Referring to FIG. 6, however, a digital feedback generator is shown which is particularly suited for adapting the fault indicate circuit to a two channel shaft encoder. Referring first to FIG. 5 which shows the output signals from an optical encoder, a pair of digital output signals A and B along with their inversions $\overline{A}$ and $\overline{B}$ are generated. Four distinct positive voltage transitions 93–96 are generated, each of which represents an increment of machine displacement. The digital feedback generator of FIG. 6 detects these four voltage transitions 93–96 and generates a four microsecond voltage pulse in response to them.

Referring to FIG. 6, the A waveform is applied to a first input terminal 97 on a first monoshot circuit 98, the B waveform is applied to a first input terminal 99 on a second monoshot circuit 100, the $\overline{A}$ waveform is applied to a first input terminal 101 on a third monoshot circuit 102, and the $\overline{B}$ waveform is applied to a first input terminal 103 on a fourth monoshot circuit 104. The monoshot circuits 98, 100, 102 and 104 are standard circuits which are commercially available in integrated circuit form. They each operate to generate a positive voltage pulse of one microsecond duration at their respective Q output terminals 105–108 when a positive voltage transition is applied to their respective first input terminals 97, 99, 101 and 103 and a clock pulse is applied to their respective clock terminals 109–112. The clock terminals 109–112 each connect to a clock pulse generator 113. The clock pulse generator 113 is a 1 megahertz (MHz) pulse generator which may, for example, be associated with the existing numerical control system to provide synchronization between the fault indicate circuit and the control system.

The Q terminals 105 and 107 on the first and third monoshots 98 and 102 connect with first and second input terminals 114 and 115 on a first OR gate 116, and the Q terminals 106 and 108 on the second and fourth monoshots 100 and 104 connect with first and second input terminals 117 and 118 on a second OR gate 119. An output terminal 120 on the first OR gate 116 connects to a J terminal 121 on a master-slave flip-flop 122, and an output terminal 123 on the second OR gate 119 connects to a K terminal 124 on the flip-flop 122. The master-slave flip-flop 122 is a commercially available circuit, the operation of which is well known to those skilled in the art. It includes a trigger terminal 108 which is connected to the clock pulse generator 113.

During normal operation, the master-slave flip-flop 122 is alternately triggered, or toggled between its set and reset state by the successively received voltage transitions 93, 94, 95 and 96. The voltage transitions 93 and 95 of the respective input waveforms A and $\bar{A}$ operate through the respective monoshots 98 and 102 and the first OR gate 116 to set the master-slave flip-flop 122, and the voltage transitions 94 and 96 of the respective input waveforms B and $\bar{B}$ operate through the respective monoshots 100 and 104 and the second OR gate 119 to reset the master-slave flip-flop 122. Thus, when the shaft encoder is operating properly the successive voltage transitions 93–96 are received in sequence, positive voltage pulses are successively generated at the monoshot Q terminals 105–108, and the flip-flop 122 is toggled by each to cause a change in voltage state at a flip-flop $\bar{Q}$ output terminal 125. If, on the other hand, one or more of the voltage waveforms is lost due to a malfunction, at least one set-reset cycle of the flip-flop 122 does not occur and the logic state at the $\bar{Q}$ terminal 125 remains fixed even though machine motion continues.

The $\bar{Q}$ terminal 125 connects to a first input terminal 126 on an exclusive OR gate 127, and a second input terminal 128 on the OR gate 127 connects to the output of an idle pulse generator 129. The idle pulse generator 129 is a conventional circuit set to generate five pulses per second, each pulse greater than 4 microseconds in duration and each in synchronism with the clock pulse generator 113. An output terminal 130 on the exclusive OR gate 127 connects to an input 131 on a monoshot circuit 132. The monoshot circuit 132 is also a standard circuit which is commercially available in integrated circuit form. It operates to generate a negative voltage pulse of four microsecond duration at a $\bar{Q}$ output terminal 133 when a positive voltage transition is received at its input terminal 113 and a clock pulse is received from the clock pulse generator 113 at a clock terminal 134. The $\bar{Q}$ terminal 133 connects to the reference reset switch 69 of FIG. 2 and provides the necessary logic low voltage to operate the PNP transistor 70.

When the machine is moving, the voltage transitions generated at the $\bar{Q}$ output terminal 125 of the flip-flop 122 are conveyed through the exclusive OR gate 127 and applied to the input terminal 131 of the monoshot 132. As a result, a position feedback pulse is generated at its $\bar{Q}$ output terminal 133 each time the flip-flop 122 is cycled. The rate at which these pulses are generated is proportional to the speed of the machine and, therefore, when the machine is stopped, or idled, the flip-flop 122 is not toggled and it remains in either its set or reset state. It is desirable to periodically operate the reference reset switch and to thereby reset the integrator circuit when the machine is idling. This is accomplished by the idle pulse generator 129 which applies digital pulses through the exclusive OR gate 127 to the monoshot circuit 132. The exclusive OR gate 127 insures that these idle pulses are conveyed to the monoshot circuit 132 regardless of the state of the flip-flop 122.

A fault indicate circuit has been described which when connected for operation with an existing numerical control system will detect and indicate any malfunctions which inhibit the generation of the position feedback signal. An absolute analog position signal is generated in response to machine motion and the magnitude thereof is sensed by a level detector. A reference reset switch is operated by the position feedback signal to repeatedly reset the analog position signal to zero and thereby keep it below a preset magnitude. When a malfunction occurs, the reference reset switch is not operated, or is not operated at a rate sufficient to maintain the analog position signal below the preset magnitude. The level detector then operates to generate a fault indicate signal. It should be apparent to those skilled in the art that the position feedback signal being monitored may be in any one of a number of forms, and that by means of a suitable converter circuit, the position feedback signal can be altered to a form suitable for operating the reference reset switch.

We claim:

1. A fault indicate circuit for monitoring a position feedback signal generated by a position transducer, the combination comprising:
   an analog signal generator connected to sense machine motion and generate an analog position signal;
   a reference reset switch connected to receive the position feedback signal and connected to said analog signal generator to reset the same to zero when actuated by said position feedback signal;
   and a level detector connected to receive the analog position signal and generate a fault indicate signal when the magnitude thereof exceeds a preset limit,
   wherein the reference reset switch is responsive to the position feedback signal to maintain said analog position signal below said preset limit during normal operating conditions.

2. The fault indicate circuit of claim 1 in which said analog signal generator includes an integrator circuit having an input connected to receive a speed signal and an output connected to said level detector.

3. The fault indicate circuit of claim 2 in which said integrator circuit includes a feedback capacitor, the reference reset switch is connected across said feedback capacitor, and the analog signal generator is reset to zero by discharging the feedback capacitor.

4. The fault indicate circuit of claim 2 in which said analog signal generator includes an absolute value circuit connected to receive a signal proportional to machine speed and generate a speed signal of singular polarity to said integrator circuit.

5. The fault indicate circuit of claim 4 in which the integrator circuit includes an operational amplifier having a feedback capacitor connected between an input terminal and an output terminal thereof, and said reference reset switch includes a transistor having its current carrying elements connected across said feedback capacitor.

6. A fault indicate circuit connected to receive a position feedback signal generated by the position transducer on a numerically controlled machine, the combination comprising:
- a digital feedback generator connected to receive the position feedback signal and adapted to generate digital feedback pulses at a rate proportional to the rate of displacement indicated by the position feedback signal;
- an analog signal generator connected to sense machine motion and generate an analog position signal, the amplitude of which changes in proportion to the amount of machine displacement;
- a reference reset switch connected for actuation by the digital feedback pulses and connected to said analog signal generator to reset it to zero each time the reference reset switch is actuated; and
- a level detector connected to receive the analog position signal and generate a fault indicate signal when the amplitude thereof exceeds a preset level.

7. The fault indicate circuit of claim 6 wherein the position transducer is a shaft encoder that generates a plurality of digital incremental position feedback signals and said digital feedback generator includes:
- A flip-flop connected to receive said digital incremental position feedback signals; and
- a monoshot circuit having an input connected to said flip-flop and an output connected to the reference reset switch, wherein the monoshot circuit generates a digital feedback pulse to the reference reset switch each time the flip-flop is cycled through its set and reset state by the received digital incremental position feedback signals.

8. The fault indicate circuit as recited in claim 7 in which said digital feedback generator includes an idle pulse generator connected to operate said reference reset switch at a low repetition rate when the machine is idling.

* * * * *